(12) United States Patent
Ahn et al.

(10) Patent No.: US 10,412,759 B2
(45) Date of Patent: Sep. 10, 2019

(54) METHOD FOR TRANSMITTING DOWNLINK IN UNLICENSED BAND

(71) Applicant: LG ELECTRONICS INC., Seoul (KR)

(72) Inventors: Joonkui Ahn, Seoul (KR); Kijun Kim, Seoul (KR); Hanjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 31 days.

(21) Appl. No.: 15/557,325

(22) PCT Filed: Mar. 11, 2016

(86) PCT No.: PCT/KR2016/002477
§ 371 (c)(1),
(2) Date: Sep. 11, 2017

(87) PCT Pub. No.: WO2016/144141
PCT Pub. Date: Sep. 15, 2016

(65) Prior Publication Data
US 2018/0139775 A1    May 17, 2018

Related U.S. Application Data

(60) Provisional application No. 62/132,477, filed on Mar. 12, 2015.

(51) Int. Cl.
*H04W 72/14* (2009.01)
*H04W 16/14* (2009.01)
*H04W 74/08* (2009.01)

(52) U.S. Cl.
CPC .......... *H04W 72/14* (2013.01); *H04W 16/14* (2013.01); *H04W 74/0808* (2013.01)

(58) Field of Classification Search
None
See application file for complete search history.

(56) References Cited

U.S. PATENT DOCUMENTS

2013/0017794 A1    1/2013    Kloper et al.
2014/0177559 A1    6/2014    Hwang et al.
(Continued)

FOREIGN PATENT DOCUMENTS

WO    WO 2013/119097 A1    8/2013
WO    WO 2014/111309 A1    7/2014
WO    WO 2014/178678 A1    11/2014

OTHER PUBLICATIONS

NTT Docomo, Inc., "Discussion on Frame Structure and LBT Mechanism for LAA", 3GPP TSG RAN WG1 Meeting #80, R1-150416, Athens, Greece, Feb. 9-13, 2015, pp. 1-4 (5 pages total).
(Continued)

*Primary Examiner* — Lonnie V Sweet
(74) *Attorney, Agent, or Firm* — Birch, Stewart, Kolasch & Birch, LLP

(57) ABSTRACT

A method for transmitting a downlink in an unlicensed band is provided. A plurality of base stations in a first group determine a first delay time from a reference time point for initiating a clear channel assessment (CCA) in the unlicensed band. The plurality of base stations execute CCA during a CCA section after the first delay time from the reference time point, and check whether a channel is idle. If the channel is idle, the plurality of base stations simultaneously transmits a downlink.

8 Claims, 8 Drawing Sheets

(56) References Cited

U.S. PATENT DOCUMENTS

| | | | |
|---|---|---|---|
| 2014/0342745 A1 | 11/2014 | Bhushan et al. | |
| 2015/0117369 A1* | 4/2015 | Merlin | H04W 72/0446 |
| | | | 370/329 |
| 2016/0142920 A1* | 5/2016 | Suzuki | H04W 16/14 |
| | | | 370/336 |
| 2016/0227489 A1* | 8/2016 | Oteri | H04W 74/0808 |
| 2017/0048880 A1* | 2/2017 | Anderson | H04W 72/1226 |

OTHER PUBLICATIONS

Samsung, "Discussion on UL Transmission for LAA", 3GPP TSG RAN WG1 #80, R1-150368, Athens, Greece, Feb. 9-13, 2015, pp. 1-7.

* cited by examiner

METHOD FOR TRANSMITTING DOWNLINK IN UNLICENSED BAND

CROSS REFERENCE TO RELATED APPLICATIONS:

This application is the National Phase of PCT International Application No. PCT/KR2016/002477, filed on Mar. 11, 2016, which claims priority under 35 U.S.C. 119(e) to U.S. Provisional Application No. 62/132,477, filed on Mar. 12, 2015, all of which are hereby expressly incorporated by reference into the present application.

BACKGROUND OF THE INVENTION

Field of the Invention

The present invention relates to wireless communication, and more particularly, to a method for downlink transmission in an unlicensed band and a method for uplink transmission in an unlicensed band.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method for downlink transmission in an unlicensed band.

The present invention provides a method for uplink transmission in an unlicensed band and a device using the same.

In an aspect, a method for downlink transmission in an unlicensed band is provided. The method includes determining, by a plurality of base stations (BSs) in a first group, a first delay time to initiate clear channel assessment (CCA) in the unlicensed band from a reference time, checking, by the plurality of BSs, whether a channel is idle by performing CCA for CCA duration after the first delay time from the reference time, and simultaneously performing, by the plurality of BSs, downlink transmissions when the channel is idle.

In another aspect, a method for uplink transmission in an unlicensed band is provided. The method includes receiving, by a wireless device, an uplink grant for uplink transmission in an unlicensed band from a base station (BS), determining, by the wireless device, a delay time to initiate clear channel assessment (CCA) from a reference time, checking, by the wireless device, whether a channel is idle by performing CCA for CCA duration after the delay time from the reference time, and performing, by the wireless device, uplink transmission based on the uplink grant when the channel is idle.

In still another aspect, a device for uplink transmission in an unlicensed band includes a transceiver to transmit and receive a radio signal and a processor coupled to the transceiver. The processor is configured to receive, via the transceiver, an uplink grant for uplink transmission in an unlicensed band from a base station (BS) through the transceiver, determine a delay time to initiate clear channel assessment (CCA) from reference time, check, via the transceiver, whether a channel is idle by performing CCA for CCA duration after the delay time from the reference time, and perform, via the transceiver, uplink transmission based on the uplink grant when the channel is idle.

In an environment where various communication protocols co-exist in an unlicensed band, deteriorating data reception quality can be prevented.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
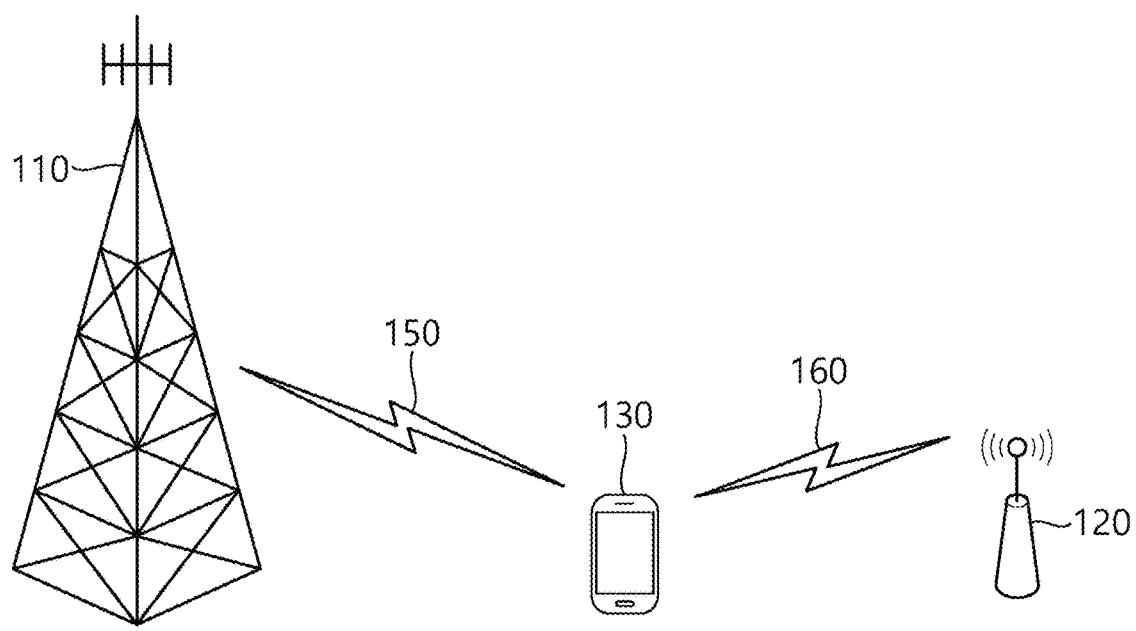
FIG. 1 shows an example of an LTE service using an unlicensed band.

FIG. 1 shows an example of an LTE service using an unlicensed band.

A wireless device 130 establishes a connection with a 1st BS 110, and receives a service through a licensed band 150. For traffic offloading, the wireless device 130 may receive a service through an unlicensed band 160 with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Hereinafter, a cell (or a carrier) operating in an unlicensed band is called an unlicensed cell or an unlicensed carrier. A cell operating in a licensed band is called a licensed cell or a licensed carrier.

Figure 2:
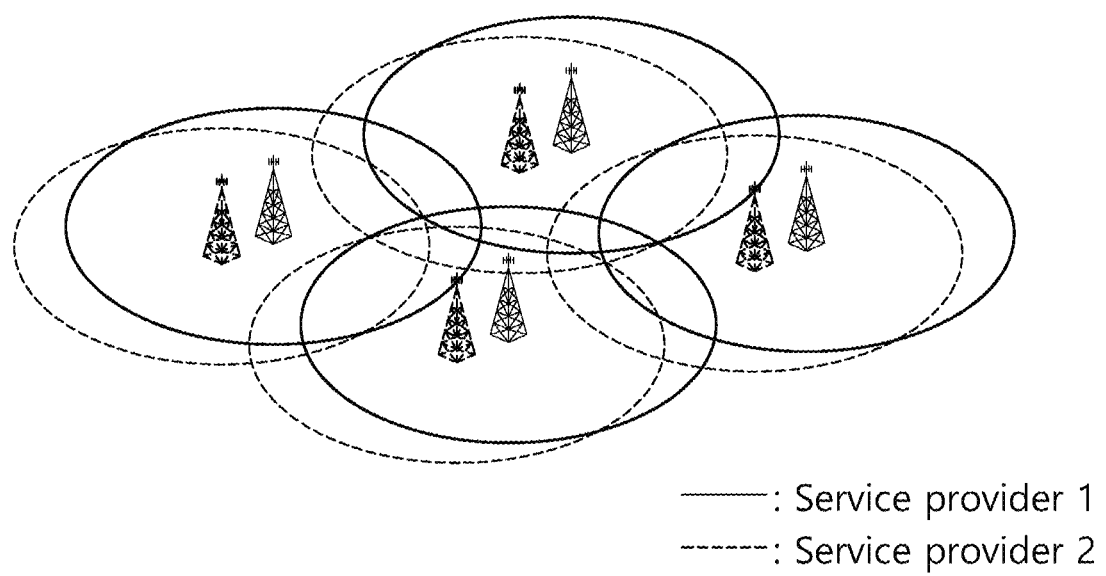
FIG. 2 shows an illustrative arrangement of a wireless communication system.

FIG. 2 shows an illustrative arrangement of a wireless communication system.

A service provider divides an area into sectors having appropriate coverage, and a BS managing each sector communicates with a UE belonging to the sector. It is possible to maximize frequency reuse by minimizing interference between different sectors and allowing simultaneous transmissions in neighboring sectors, thus increasing overall system throughput.

Since it is difficult to adjust the coverage of the sectors or to adjust the distance between BSs between a plurality of service providers, simultaneous transmissions of traffic by adjacent BSs belonging to different service providers may cause serious interference.

Therefore, if simultaneous transmissions by BSs of the same wireless service provider are allowed and simultaneous transmissions by BSs of different wireless service providers are avoided through an LBT operation, overall system performance may be increased. Likewise, if simultaneous transmissions by UEs connected to BSs of the same service provider are allowed and simultaneous transmissions by UEs connected to BSs of different service providers are avoided through an LBT operation, overall system performance may be increased.

Hereinafter, a method for performing a radio channel access operation based on LBT in an unlicensed band while increasing the probability of simultaneous transmissions by nodes (for example, BSs and UEs) belonging to the same group is proposed.

Figure 3:
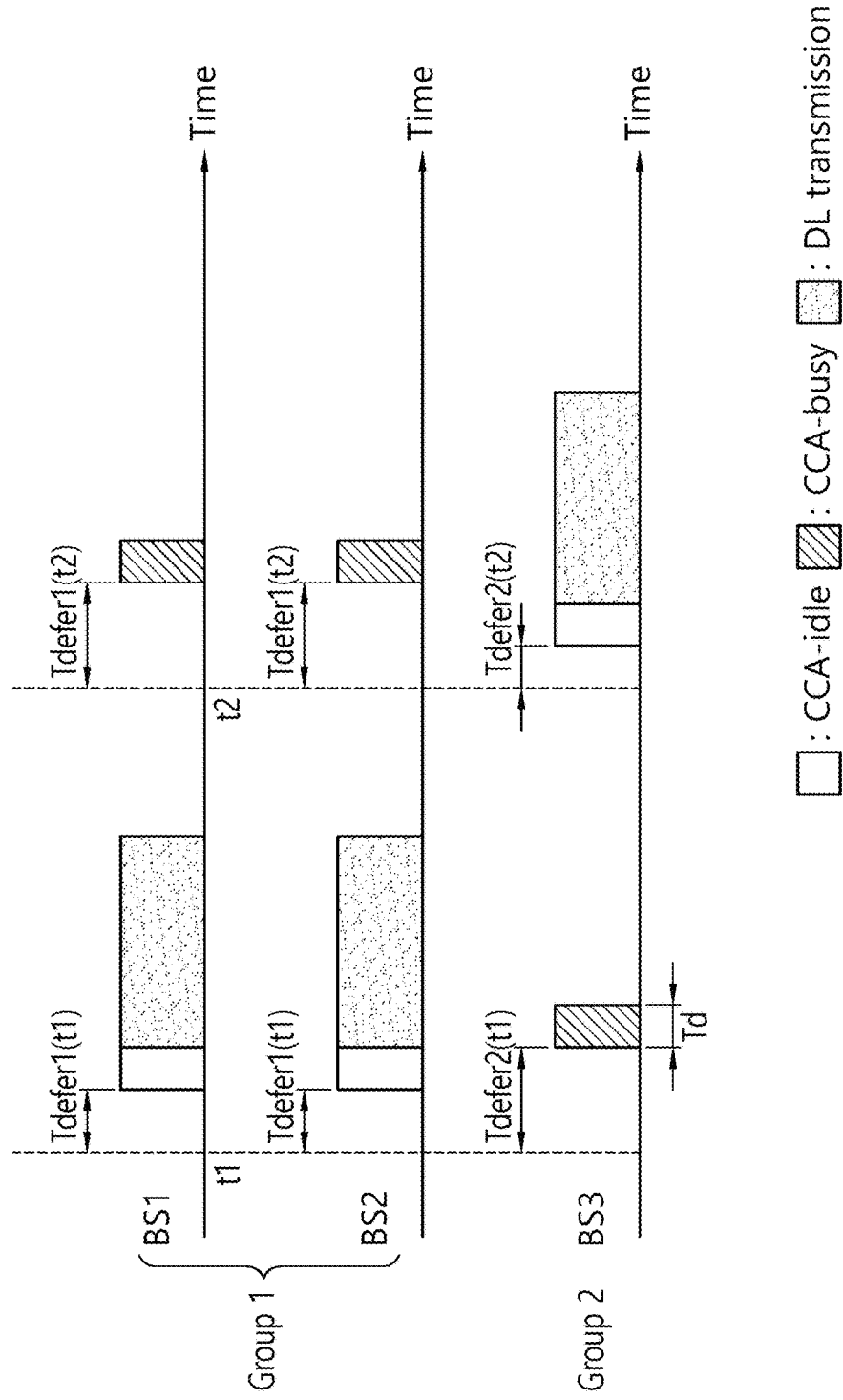
FIG. 3 shows a communication method according to an embodiment of the present invention.

FIG. 3 shows a communication method according to an embodiment of the present invention.

BS1 and BS2 are BSs belonging to a first group, and BS3 is a BS belonging to a second group. The number of groups and the number of BSs belonging to a group are provided only for illustrative purposes.

A criterion for dividing BSs by group may be a wireless service provider, a geographical characteristic, a frequency band, or the like, without being limited thereto.

First, terms are defined as follows.

t1 and t2: Reference time for transmission or CCA. Reference time may be the boundary between subframes boundary or the boundary between radio frames. Reference time may be a point which is defined by a specific pattern or at which channel occupation expires.

Tdefer: Delay time from the reference time to the start of CCA. Tdefer1(t1) denotes Tdefer of a first group at t1.

Td: CCA duration for which CCA is performed.

According to one embodiment, the same delay time Tdefer is defined for each group. A delay time may be a fixed value obtained based on a group-specific parameter (for example, a group identifier) or may be obtained based on a group-specific parameter in a specific period or at every reference time. A delay time may be defined randomly at every reference time.

Each BS performs CCA for CCA duration Td after a delay time from each reference time, and may start DL transmission when determining that a channel is not occupied.

BS1 and BS2 in the first group start CCA after the same Tdefer1 (t1) from t1. As a result of CCA, when a channel is idle, BS1 and BS2 start DL transmission at t1+Tdefer1(t1)+Td. Since Tdefer2(t1) is longer than Tdefer1(t1), BS3 in the second group, which performs CCA from Tdefer2(t1), determines that the channel is busy and waits for transmission.

In t2, Tdefer1(t2) is longer than Tdefer2 (t2). Thus, BS3 in the second group may detect an idle channel to start transmission.

Since BSs belonging to different groups start CCA from different times, the BSs in the different groups can perform transmissions, avoiding a collision between each other through an LBT operation.

Figure 4:
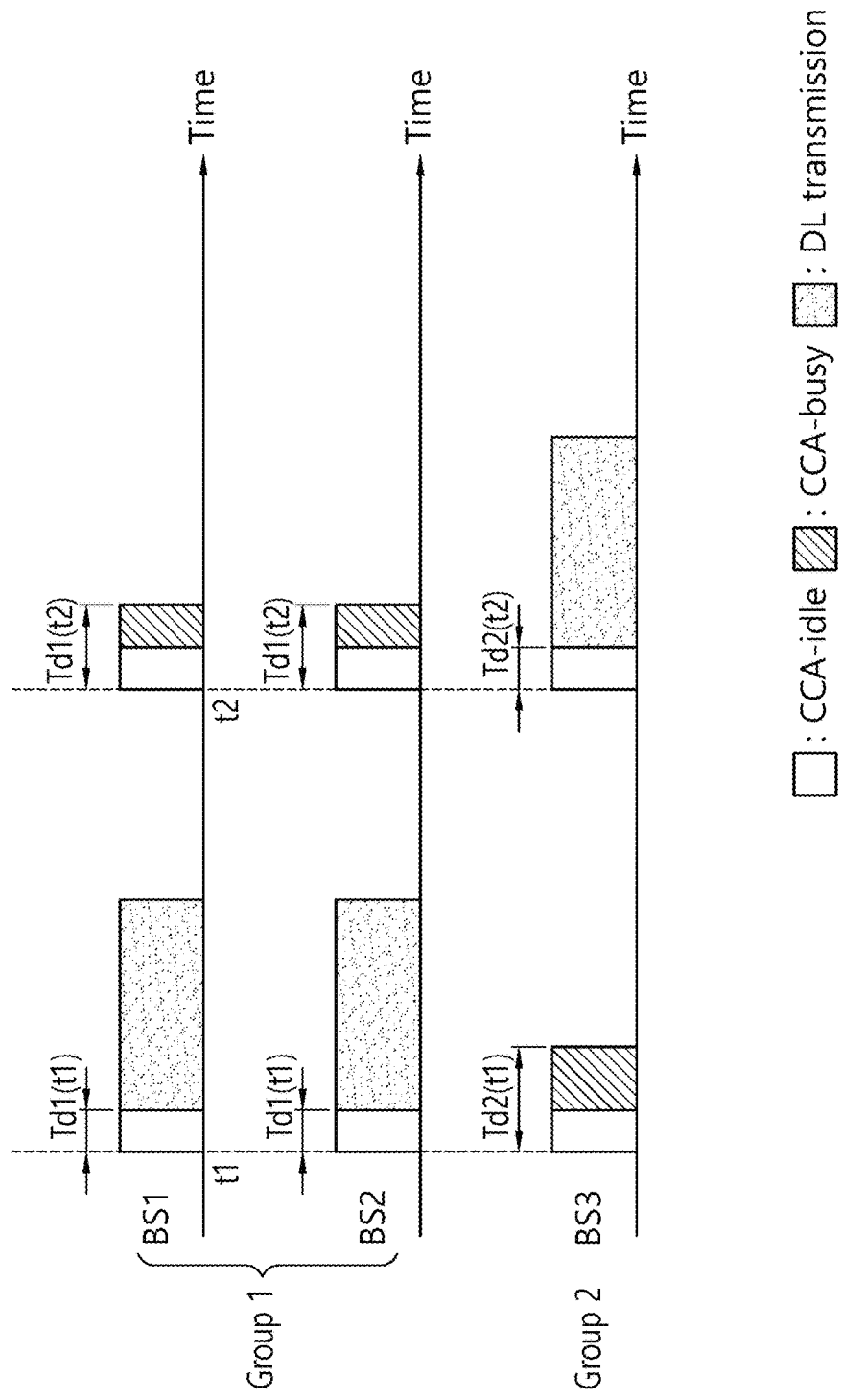
FIG. 4 shows a communication method according to another embodiment of the present invention.

FIG. 4 shows a communication method according to another embodiment of the present invention.

The same CCA duration Td is defined for each group. CCA duration may be a fixed value obtained based on a group-specific parameter (for example, a group identifier) or may be obtained based on a group-specific parameter in a specific period or at every reference time. CCA duration may be defined randomly at every reference time.

Td1(t1) denotes Td of the first group in t1, and Td2(t1) denotes Td of the second group in t1.

A BS may start CCA from t1, and may start transmission from time t1+Td(t1) when determining that a channel is not occupied.

BS1 and BS2 in the first group perform CCA for the same Td1(t1) from t1. As a result of CCA, when a channel is idle, BS1 and BS2 start DL transmission at t1+Td1(t1). Since Td2(t1) is longer than Td1(t1), BS3 in the second group, which performs CCA for Td2(t1), determines that the channel is busy and waits for transmission.

In t2, Td1(t2) is longer than Td2(t2). Thus, BS3 in the second group may detect an idle channel for Td2(t2) and may start transmission.

Since BSs belonging to different groups have different lengths of CCA duration, the BSs in the different groups can perform transmissions, avoiding a collision between each other through an LBT operation.

Figure 5:
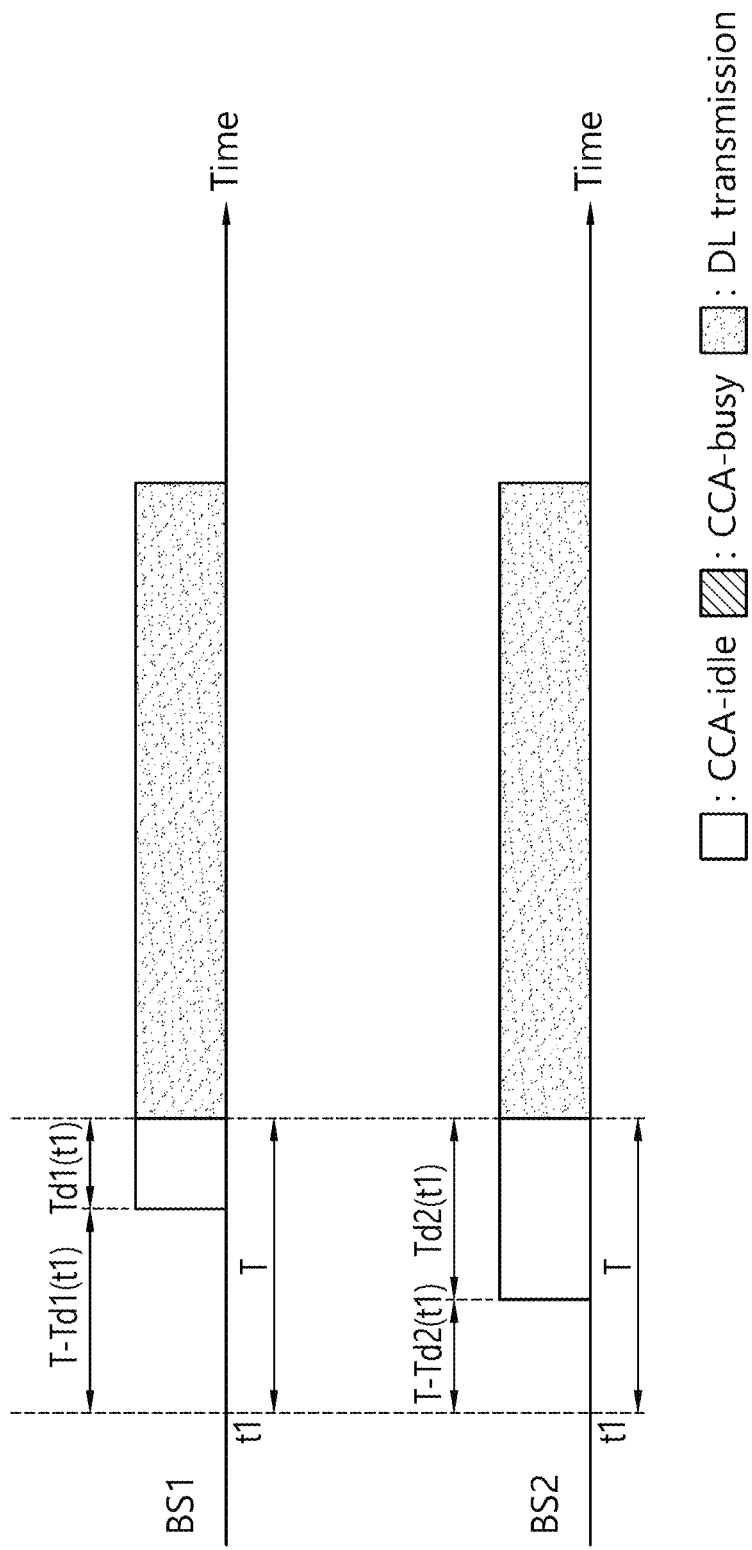
FIG. 5 shows a communication method according to still another embodiment of the present invention.

FIG. 5 shows a communication method according to still another embodiment of the present invention.

Different lengths of CCA duration are defined at reference time t1 for BSs belonging to the same group, and a delay time is defined in inverse proportion to CCA duration. A transmission start time T is a time for actually starting transmission after CCA is finished.

In t1, CCA duration Td1(t1) is defined for BS1 and Td2(t1) is defined for BS2. A delay time for deferring the start of CCA is Tdefer1(t1)=T−Td1(t1) for BS1 and is Tdefer2(t1)=T−Td2(t1) for BS2. When a channel is not occupied from t1 to t+T, both BS1 and BS2 can start transmission at t+T.

Different transmission start times T may be set for different groups in order to prevent BSs in the different groups from simultaneously starting transmission.

Information on a pattern for reference time (the cycle of reference time/offset) may be shared among BSs in the same group. The BSs may provide a UE with the information on the pattern.

Information on parameters for determining a delay time, CCA duration, and/or transmission start time may be shared among BSs in same group. The BSs may provide a UE with the information on the parameters.

The foregoing embodiments for frequency reuse relate to BSs belonging to different groups. These embodiments may also be applied to UEs belonging to different groups.

Figure 6:
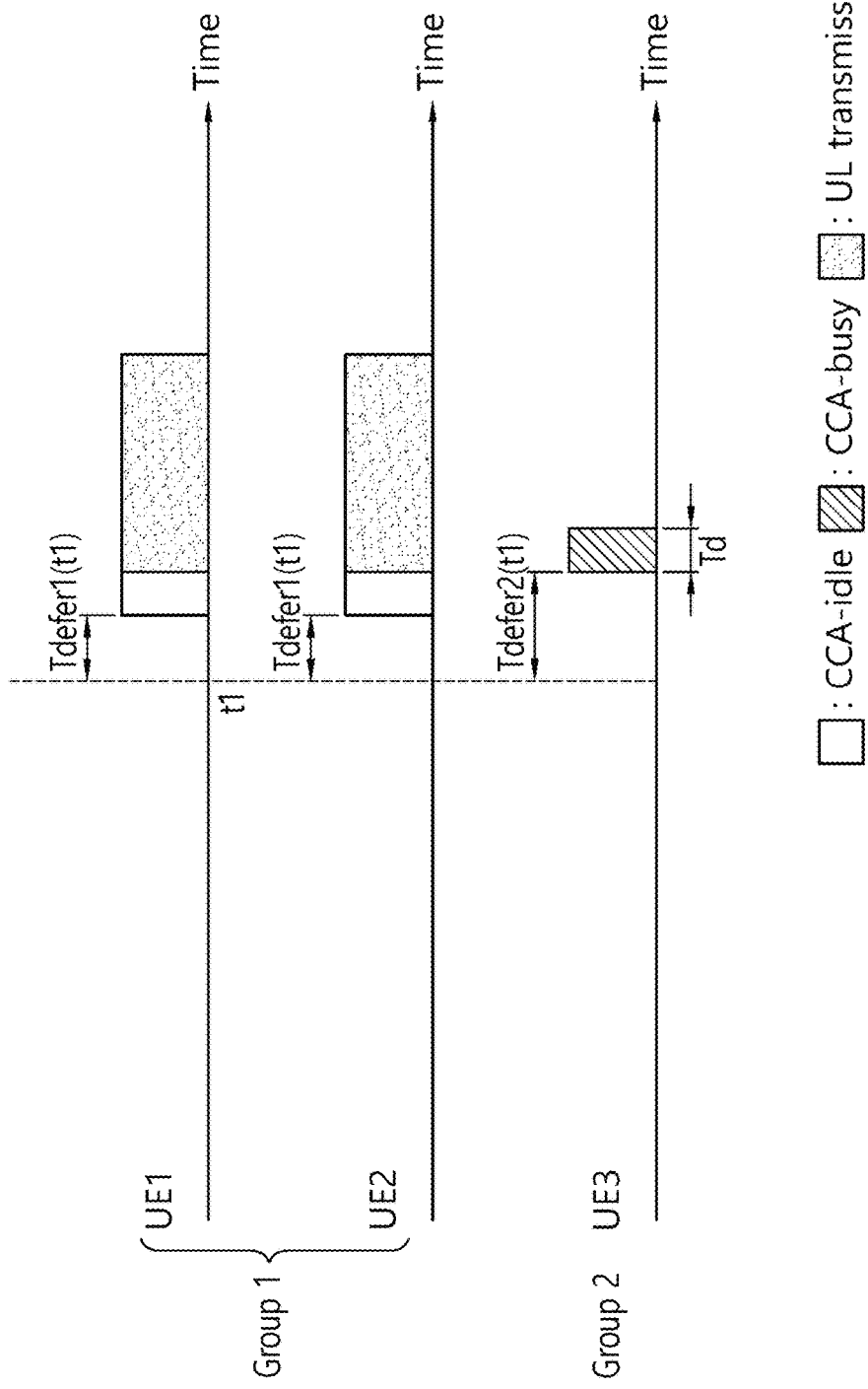
FIG. 6 shows a method for uplink transmission according to an embodiment of the present invention.

FIG. 6 shows a method for uplink transmission according to an embodiment of the present invention.

UE1 and UE2 belong to a first group, and UE3 belongs to a second group. A criterion for dividing UEs by group may be a wireless service provider, a geographical characteristic, a frequency band, or the like, without being limited thereto. Specifically, the first group may include a UE connected to a BS operated by a first service provider, and the second group may include a UE connected to a BS operated by a second service provider.

A plurality of groups may trigger uplink transmissions at the same reference time. Suppose that UE1 and UE2 in the first group receive a first UL grant and UE2 in the second group receives a second UL grant. A separate UL grant may be given for each UE, or UL transmissions by a plurality of UEs may be triggered by a single UL grant.

Reference time t1 is a point at which CCA for UL transmission may be started upon receiving a UL grant.

The same delay time Tdefer is defined for each group. A delay time may be a fixed value obtained based on a group-specific parameter (for example, a group identifier) or may be obtained based on a group-specific parameter in a specific period or at every reference time. A delay time may be defined randomly at every reference time. A UL grant for each group may include information on parameters used to determine a corresponding delay time.

Each UE performs CCA for CCA duration Td after a delay time from each reference time, and may start UL transmission when determining that a channel is not occupied.

UE1 and UE2 in the first group start CCA after the same Tdefer1 (t1) from t1. As a result of CCA, when a channel is idle, UE1 and UE2 start UL transmission at t1+Tdefer(t1)+ Td. Since Tdefer2(t1) is longer than Tdefer1(t1), UE3 in the second group, which performs CCA from Tdefer2(t1), determines that the channel is busy and waits for transmission.

Figure 7:
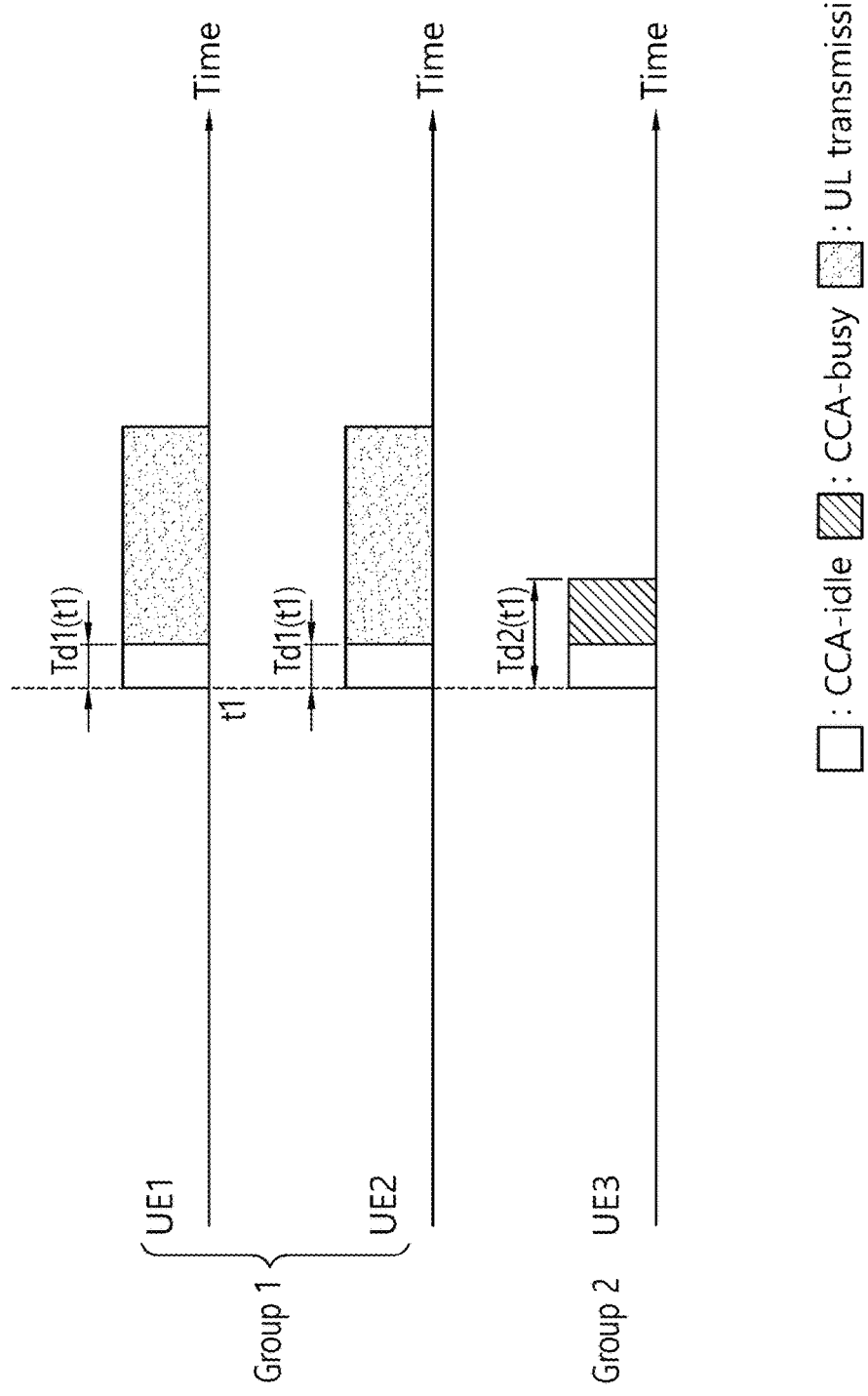
FIG. 7 shows a method for uplink transmission according to another embodiment of the present invention.

FIG. 7 shows a method for uplink transmission according to another embodiment of the present invention.

The same CCA duration Td is defined for each group. CCA duration may be a fixed value obtained based on a group-specific parameter (for example, a group identifier) or may be obtained based on a group-specific parameter in a specific period or at every reference time. CCA duration may be defined randomly at every reference time. A UL grant for each group may include information on parameters used to determine corresponding CCA duration.

Td1(t1) denotes Td of the first group in t1, and Td2(t1) denotes Td of the second group in t1.

A UE may start CCA from t1, and may start transmission from time t1+Td(t1) when determining that a channel is not occupied.

UE1 and UE2 in the first group perform CCA for the same Td1(t1) from t1. As a result of CCA, when a channel is idle, UE1 and UE2 start UL transmission at t1+Td1(t1). Since Td2(t1) is longer than Td1(t1), UE3 in the second group, which performs CCA for Td2(t1), determines that the channel is busy and waits for transmission.

Figure 8:
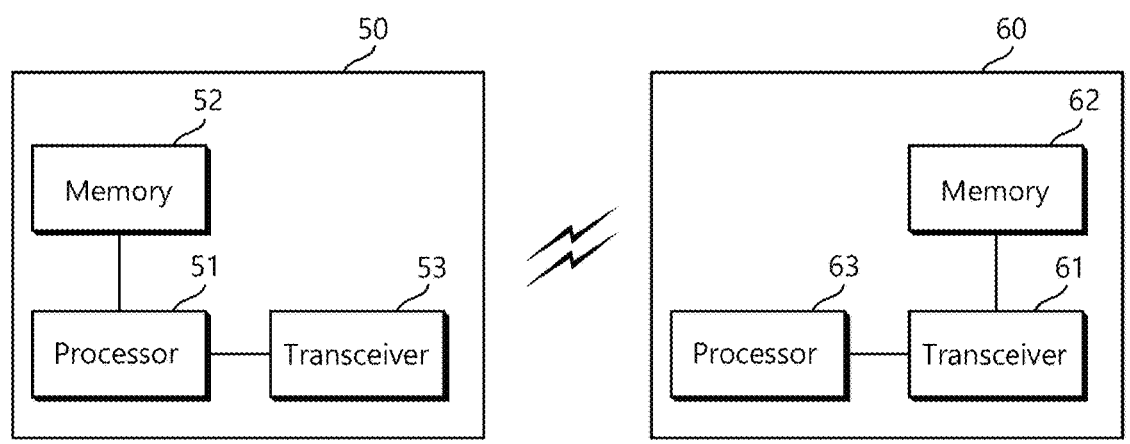
FIG. 8 is a block diagram illustrating a wireless communication system according to an embodiment of the present invention.

FIG. 8 is a block diagram illustrating a wireless communication system according to an embodiment of the present invention.

A wireless device 50 includes a processor 51, a memory 52, and a transceiver 53. The memory 52 is coupled to the processor 51 and stores various instructions that are executed by the processor 51. The transceiver 53 is coupled to the processor 51 and transmits and/or receives radio signals. The processor 51 implements the proposed functions, processes and/or methods. In the embodiments described above, an operation of a UE may be implemented by the processor 51. When the above-described embodiments are implemented by software instructions, the instructions may be stored in the memory 52 and may be executed by the processor 51, thereby performing the operations described above.

A BS 60 includes a processor 61, a memory 62, and a transceiver 63. The BS 60 may operate in an unlicensed band. The memory 62 is coupled to the processor 61 and stores various instructions that are executed by the processor 61. The transceiver 63 is coupled to the processor 61 and transmits and/or receives radio signals. The processor 61 implements the proposed functions, processes and/or methods. In the embodiments described above, an operation of a BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for downlink transmission in an unlicensed band, the method comprising:
   determining, by a first base station (BS)in a first group, a first delay time to initiate first clear channel assessment (CCA) in the unlicensed band from a reference time;
   determining, by a second BS in the first group, a second delay time to initiate second CCA in the unlicensed band from the reference time, wherein the first delay time is longer than the second delay time;
   checking, by the first BS, whether a channel is idle by performing the first CCA during a first CCA duration after the first delay time, wherein the first CCA duration is defined in inverse proportion to the first delay time;
   checking, by the second BS, whether the channel is idle by performing the second CCA during a second CCA duration after the second delay time, wherein the second CCA duration is defined in inverse proportion to the second delay time; and
   simultaneously performing, by the first and second BSs, downlink transmissions during the same time when the channel is idle.

2. The method of claim 1, further comprising:
   determining, by a third BS in a second group, a third delay time to initiate third CCA from the reference time,
   wherein the third delay time is longer than the first delay time; and
   checking, by the third BS, whether the channel is busy by performing the third CCA during a third CCA duration after the third delay time, wherein the third CCA duration is defined in inverse proportion to the third delay time,
   wherein downlink transmission is not performed by the third BS when the channel is busy while the first and second BSs perform the downlink transmissions simultaneously.

3. The method of claim 1, wherein the first delay time and the second delay time are determined based on a parameter specific to the first group.

4. The method of claim 1, wherein the first delay time and the second delay time are determined at each reference time.

5. A wireless communication system, comprising:
   a first base station (BS) in a first group configured to determine a first delay time to initiate first clear channel assessment (CCA) in the unlicensed band from a reference time; and
   a second BS in the first group configured to determine a second delay time to initiate second CCA in the unlicensed band from the reference time,
   wherein the first delay time is longer than the second delay time, wherein the first BS checks whether a channel is idle by performing the first CCA during a first CCA duration after the first delay time, wherein the first CCA duration is defined in inverse proportion to the first delay time, wherein the second BS checks whether the channel is idle by performing the second CCA during a second CCA duration after the second delay time, wherein the second CCA duration is defined in inverse proportion to the second delay time, and wherein the first and second BSs simultaneously perform downlink transmissions during the same time when the channel is idle.

6. The wireless communication system of claim 5, further comprising:

a third BS in a second group configured to determine a third delay time to initiate third CCA from the reference time, wherein the third BS checks whether the channel is busy by performing the third CCA during a third CCA duration after the third delay time, wherein the third CCA duration is defined in inverse proportion to the third delay time, wherein the third delay time is longer than the first delay time, and wherein downlink transmission is not performed by the third BS when the channel is busy while the first and second BSs perform the downlink transmissions simultaneously.

7. The wireless communication system of claim 5, wherein the first delay time and the second delay time are determined based on a parameter specific to the first group.

8. The wireless communication system of claim 5, wherein the first delay time and the second delay time are determined at each reference time.

* * * * *